United States Patent
Reeves et al.

(10) Patent No.: US 7,857,177 B2
(45) Date of Patent: Dec. 28, 2010

(54) BICYCLE RACK FOR A VEHICLE BED

(75) Inventors: Mike Reeves, Woodinville, WA (US);
Robert A. Starr, Auburn, WA (US);
Eric Rayl, Woodinville, WA (US)

(73) Assignee: Thule Sweden AB, Hillerstorp (SE)

( * ) Notice: Subject to any disclaimer, the term of this patent is extended or adjusted under 35 U.S.C. 154(b) by 743 days.

(21) Appl. No.: 11/161,379

(22) Filed: Aug. 1, 2005

(65) Prior Publication Data

US 2007/0246496 A1 Oct. 25, 2007

Related U.S. Application Data

(60) Provisional application No. 60/592,419, filed on Jul. 30, 2004.

(51) Int. Cl.
*B60R 9/10* (2006.01)
(52) U.S. Cl. .................................... 224/403
(58) Field of Classification Search ......... 224/402–405, 224/924; 211/20, 21, 23, 24
See application file for complete search history.

(56) References Cited

U.S. PATENT DOCUMENTS

| | | | |
|---|---|---|---|
| 4,437,597 A * | 3/1984 | Doyle | 224/533 |
| 4,852,779 A | 8/1989 | Berg | |
| 5,092,504 A | 3/1992 | Hannes et al. | |
| 6,179,181 B1 * | 1/2001 | Johnson et al. | 224/405 |
| 6,367,673 B1 | 4/2002 | Smith et al. | |
| 6,439,397 B1 | 8/2002 | Reeves | |
| 6,460,743 B2 * | 10/2002 | Edgerly et al. | 224/324 |
| 6,761,297 B1 * | 7/2004 | Pedrini | 224/519 |
| 6,863,481 B2 * | 3/2005 | Pingel | 410/30 |
| 7,051,909 B2 * | 5/2006 | Gibson | 224/403 |

* cited by examiner

*Primary Examiner*—Nathan J Newhouse
*Assistant Examiner*—Corey N Skurdal
(74) *Attorney, Agent, or Firm*—Novak Druce & Quigg LLP

(57) ABSTRACT

Method and arrangement for providing a bicycle transport system that includes a rack assembly securing a bicycle, with both wheels still attached, in the bed of a pickup truck without requiring physical modification of the pickup truck bed. The transport system includes a rack frame having a securing assembly releasably securing the rack frame in the bed of a transporting pickup truck. The system also includes a bicycle restraining portion that is maintained in abutting engagement with a front tire of a bicycle being transported in the pickup truck bed. The securing assembly has an anchor member that in a secured configuration maintains the rack frame in abutment with the pickup truck bed so that the rack frame is substantially fixing relative to the truck bed. The bicycle restraining portion has a constrictable arm that presses upon the front tire of the bicycle in a transporting configuration. The arm exerts a compression force, obliquely directed with respect to both horizontal and vertical, upon the bicycle front tire in such a manner that the tire is compressed into a substantially fixed position above the truck bed when in the bicycle transporting configuration.

21 Claims, 16 Drawing Sheets

BICYCLE RACK FOR A VEHICLE BED

CROSS REFERENCE TO RELATED APPLICATIONS

This application claims the benefit of U.S. Provisional Patent Application No. 60/592,419, filed Jul. 30, 2004, the same being expressly incorporated herein by reference.

TECHNICAL FIELD OF THE INVENTION

The present invention relates to load carriers for vehicles, and more particularly to a rack assembly for securing wheeled vehicles, such as bicycles, tricycles, mopeds, motorcycles and the like, over the bed structure of a vehicle, such as that of a pickup truck.

BACKGROUND OF THE INVENTION

The transportation of wheeled vehicles, such as bicycles, tricycles, mopeds, motorcycles and the like using vehicle load carriers is known and vehicle load carriers for transporting wheeled vehicles, such as bicycles, typically includes the use of roof mounted type load carriers, also known as roof racks, or rear mounted type load carriers, which are often fastened to the rearward side of a vehicle or upon the hitch of a vehicle.

When transporting bicycles or like wheeled vehicles in vehicles having bed structures, e.g., pickup trucks, individuals typically load the bicycle into the bed by laying the bicycle directly on the bed surface or leaning the bicycle against a sidewall of the bed. While such techniques are relatively simple, the loaded equipment is not necessarily sufficiently secured upon the bed. Indeed, when transporting a bicycle in this manner it is not uncommon for the bicycle to shift, which can damage the bicycle, the transporting vehicle, or both. Additionally, in some instances, bicycles loaded in this manner can fall out during transport and cause severe damage or injury.

While assemblies have been developed for loading and securing bicycles, and like wheeled vehicles, into vehicle beds, such assemblies have generally proved insufficient for conveniently transporting or preventing damage to the bicycle or transporting vehicle. For example, one known assembly employs a rack that is bolted to a pickup truck bed and includes a strut for attaching the forks of a bicycle thereto. A problem with this known assembly is that holes must be drilled into the bed of the vehicle. Furthermore, the front wheel of the bicycle must be removed so that the forks may be attached to the assembly. The removal of the front wheel is not only an inconvenience to a user, but more importantly, a bicycle rack that attaches the bicycle via the forks may not be capable of accommodating a variety of bicycle fork types, e.g., racing, touring, mountain, BMX, etc., bicycle forks. Also, the detached wheel must be separately stowed in some manner.

Another type of assembly used for loading and securing a bicycle upon a vehicle bed consists of a strap or crossbar that is tensioned between the sidewalls of a vehicle bed. A problem with this type of assembly is that these assemblies are usually only secured against the sidewalls of a vehicle bed and have a tendency to shift or work themselves loose during transport. This allows the assembly to become unsecured and possibly cause damage or injury. Also, because the tension provided by the crossbar or strap is the primary means for securing the assembly between the sidewalls of the vehicle, if the tension in the crossbar or straps is reduced, as may occur through loosening or failure, the bicycle may also become loose or free and possibly cause damage or injury.

Also, while some known assemblies are capable of accommodating bicycles with their front wheels installed, such assemblies typically do not provide sufficient securement to the bed of a vehicle, do not sufficiently secure a bicycle within the assembly, or require the removal of a wheel of the bicycle. For example, a known rack assembly for use in a pickup truck bed is secured to the pickup truck by passing straps through a gap between the bed and the tailgate of the pickup truck. When the tailgate is closed, the straps are tensioned, which secures the rack assembly therein by causing a portion of the rack assembly to bear against the tailgate. A problem with this known assembly, however, is that a wheel of a bicycle must be removed and secured via the forks of the bicycle. As previously noted, these types of assemblies are undesirable because they lack the ability to secure a variety of bicycles having different fork structures and the wheels must be removed and separately stowed, and too often, the user simply rests the separated wheel in the bed of the vehicle where it can shift about and cause damage.

U.S. Pat. Nos. 5,092,504 and 6,367,673 disclose bicycle racks for use in truck beds, but each disclosed arrangement detrimentally requires that the front wheel of the bicycle be removed in order to use the rack. U.S. Pat. No. 4,852,779 discloses a truck bed rack for a motorcycle in which the front wheel remains installed on the bike when being transported, but modification of the truck is undesirably required (Column 3, lines 15-20) in that U-bolts are used to rigidly secure an anchor sleeve to the bed of the automotive vehicle. Still further, the use of hooked elastic bands connect directly to the bike frame and not the bike's front tire which lends less stability to the system than direct connection to the front tire of the bike which results in fixed location of that tire during transport. Further still, the bike tire exclusively engages the rack frame structure without any stabilizing contact with the truck bed itself. Certain specialized racks are also known that must be attached to the carrying vehicle at specific locations other than in the bed of a pickup truck such as the hitch-mount rack known by the tradename CYCLE-ON. In addition to not being mountable in a truck bed, this rack's specialized configuration enabling such hitch mounting teaches away from any type of adaptation to that rack which would permit its mounting at any other location on a carrying vehicle, and especially not with the carried bicycle(s) being located at a fixed position above the bed of a truck during transport.

Accordingly, there has existed a longfelt need for a rack assembly that secures a wheeled vehicle, such as a bicycle, within the bed of a transporting vehicle that is quick and easy to install, that does not require removal of a wheel, and which is capable of accommodating an array of wheeled vehicle types.

SUMMARY OF THE INVENTION

Many bicyclist are also pickup truck owners who use these vehicles for transporting their bicycles. In that at least a part of the bed space is often available for such bike transporting, these consumers have established a demand for racks that can be easily installed in the bed of their trucks. These users typically have two primary desires; the first is upright stability for the bike(s) being transported and the second is avoiding permanent modification of the truck itself just to facilitate use of the rack. The first desire stems from the fact that upright transport of a bicycle resting on its tires best avoids damage to the bike when other rack contact can then be avoided. Still further, exclusive rack contact with the bike at its tires permits the tires to act as buffers against the rack. Still further, the resilient nature of inflated tires permits their acting as take-up devices that eliminate play between the bike and a carrying rack that has slightly relaxed its grip upon the bike tire during transport.

It has also been recognized as a benefit to have such tire-constrained bicycles stabilized with respect to the carrying truck bed. Advantageously, the present invention provides such stability by compressing the tire into pressing engagement with the truck bed at one or more locations. It has been found particularly advantageous to locate the bike rack in the truck bed so that when a bike tire is properly installed and secured, the tire is press-engaged with a vertical surface such as the interior surface of the tailgate or sidewall of the bed. Alternatively, or in addition to the vertical surface contact, the tire can also be advantageously press-engaged with a horizontal surface of the truck bed such as the bed floor, or the rack itself.

The presently disclosed invention delivers these and further benefits through the provision of a bicycle transport system that includes a rack assembly securing a bicycle, with both wheels still attached, in the bed of a pickup truck without requiring physical modification of the pickup truck bed. The transport system comprises (includes, but is not necessarily limited to) a rack frame having a securing assembly releasably securing the rack frame in the bed of a transporting pickup truck. The system also includes a bicycle restraining portion that is maintained in abutting engagement (pressing up against) with a front tire of a bicycle being transported in the pickup truck bed. The securing assembly has an anchor member that in a secured configuration maintains the rack frame in abutment (contact) with the pickup truck bed so that the rack frame is substantially fixing relative to the truck bed. The bicycle restraining portion comprises a constrictable arm that presses upon the front tire of the bicycle in a transporting configuration. The arm exerts a compression force, obliquely (neither perpendicular nor parallel; i.e., having a slanting direction) directed with respect to both horizontal and vertical, upon the bicycle front tire in such a manner that the tire is compressed into a substantially fixed position above the truck bed when in the bicycle transporting configuration.

In a further embodiment, the invention takes the form of a rack assembly and method for securing an apparatus, such as a bicycle, in a transporting vehicle having a bed structure, such as a pickup, according to the present invention broadly includes a rack frame and a securing assembly configured to secure the apparatus to the transport vehicle above the bed structure. The securing assembly adjustably clampably secures to the rack frame and the rack frame comprises a restraining assembly that is pivotal with respect to the bed structure. The securing assembly and the restraining assembly, in combination, are configured to simultaneously secure the rack frame to the transporting vehicle and apply a force upon the apparatus such that the apparatus is compressibly secured between the restraining assembly and the bed structure.

In some embodiments, the rack frame is configured to include a wheel restraining portion for restraining a wheel. The wheel restraining portion is pivotal about the wheel and the securing assembly and the wheel restraining portion, in combination, simultaneously secure the rack frame to the transporting vehicle and apply a force upon the wheel to compressively secure the wheel between the wheel restraining portion and the bed structure. In some embodiments, the wheel restraining portion pivots about a front wheel of the apparatus, e.g., a bicycle, and applies a compressive force thereupon to secure the apparatus over the bed structure.

In some embodiments, the restraining assembly comprises an integral portion of the rack frame and is pivotal with respect to the bed structure. In other embodiments the restraining assembly comprises an extensible arm pivotally coupled to the rack frame and configured for pivoting movement with respect to the rack frame and the bed structure.

In some embodiments, the apparatus is compressively secured between a surface of the bed structure and a wall; e.g., a tailgate or bed structure sidewall, which wall can be perpendicularly disposed with respect to the surface of the bed structure.

In some embodiments, the rack frame includes a wheel well for receiving a wheel of a wheeled vehicle therein. In some embodiments, a portion of the restraining member has a shape that substantially corresponds with a perimeter, or profile, of a wheel, e.g. a rim, sidewalls and tread portions of a bicycle wheel. In some embodiments, the restraining member includes a wheel saddle tray for receiving a wheel therein. Preferably, the wheel saddle tray has a shape that substantially extends about an outer circumferential portion of a wheel and corresponds to a perimeter of the wheel.

A method of securing an apparatus, e.g., a bicycle, over a bed structure of a transporting vehicle comprises securing a rack frame comprising a restraining assembly over the bed structure of the transporting vehicle with a securing assembly, wherein the securing assembly adjustably clampably couples to the rack frame, pivoting the restraining assembly about a portion of the apparatus to dispose the apparatus between the restraining assembly and the bed structure, and applying a force upon the apparatus with the restraining assembly such that the apparatus is compressibly secured between the restraining assembly and the bed structure.

In some embodiments of the method, the apparatus comprises a bicycle and the restraining member is pivoted about a wheel, and preferably a front wheel, of the bicycle. The restraining member, thus, applies a compressive force upon the wheel to compressively secure the wheel between the restraining assembly and the bed structure of the transporting vehicle.

In some embodiments of the method, the restraining member comprises an integral portion of the rack frame. In other embodiments of the method, the restraining member is pivotally coupled to the rack frame and is configured for pivotal movement with respect to the rack frame and the bed structure.

In some embodiments of the method, the apparatus, e.g. wheel of a bicycle, is compressively secured between a surface of the bed structure and a wall, e.g. a tailgate or bed structure sidewall, which wall can be perpendicularly disposed with respect to the surface of the bed structure.

In some embodiments of the method, the rack frame includes a wheel well for receiving a wheel of a wheeled vehicle therein. In some embodiments, a portion of the restraining member has a shape that substantially corresponds with a perimeter, or profile, of a wheel, e.g. rim, sidewalls and tread portions of a bicycle wheel. In some embodiments, the restraining member includes a wheel saddle tray for receiving a wheel therein. Preferably, the wheel saddle tray has a shape that substantially extends about an outer circumferential portion of a wheel and corresponds to a perimeter of the wheel.

BRIEF DESCRIPTION OF THE DRAWINGS

The present invention will now be more fully described, by way of example, with reference to the accompanying drawings in which.

DETAILED DESCRIPTION OF THE INVENTION

Figure 1:
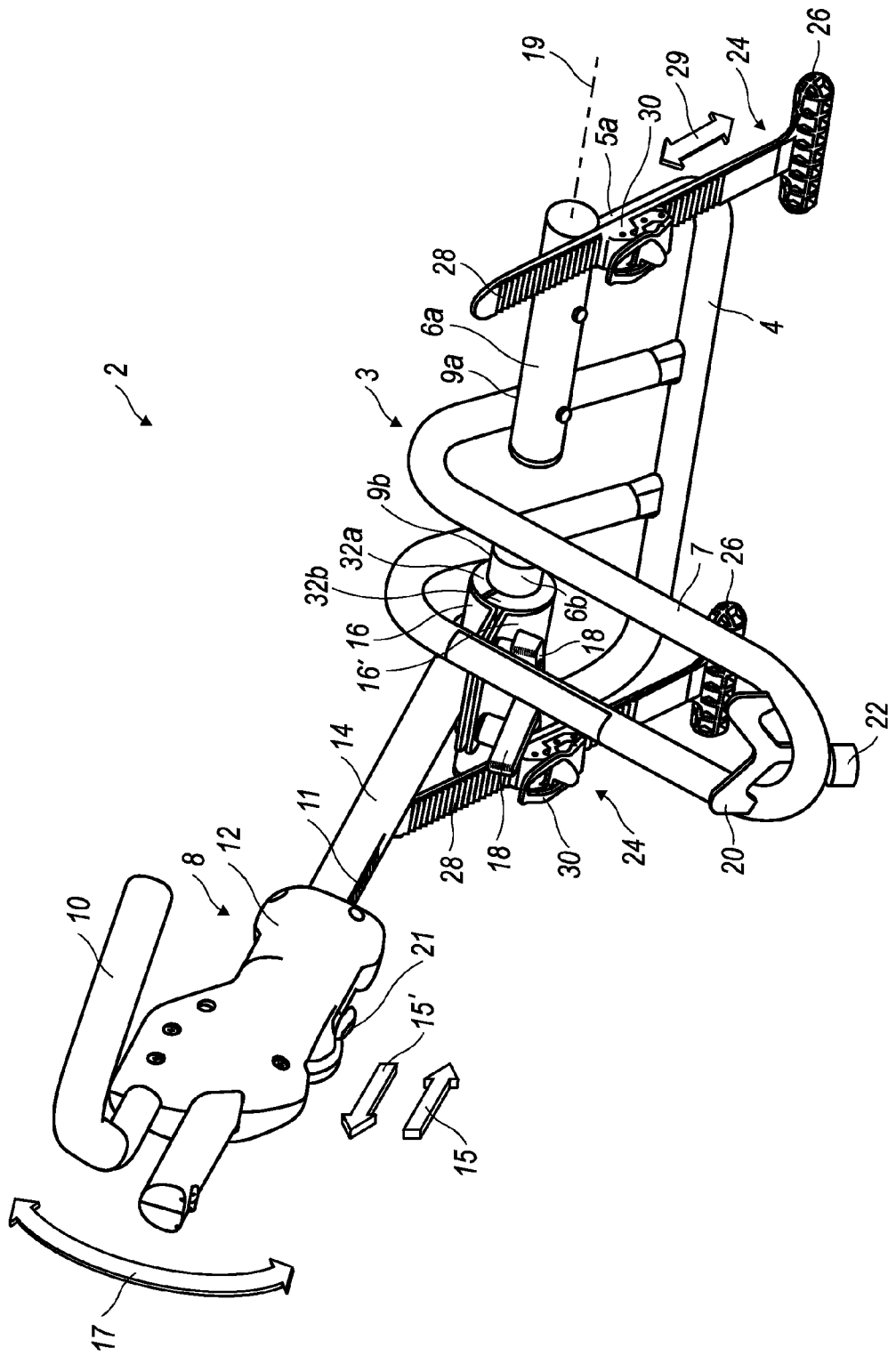
FIG. 1 is a perspective view of a rack assembly according to the invention.

The present invention will now be more described and disclosed in greater detail. It is to be understood, however, that the disclosed embodiments are merely exemplary of the invention and that the invention may be embodied in various and alternative forms. It should also be understood that the accompanying figures are not necessarily to scale and some features may be exaggerated, or minimized, to show details of particular components. Therefore, specific structural and functional details disclosed herein are not to be interpreted as limiting the scope of the claims, but are merely provided as an example to teach one having ordinary skill in the art to make and use the invention. It should also be appreciated that in the detailed description that follows, like reference numerals on different drawing views are intended to identify like structural elements. It should also be appreciated that while the present invention is primarily described as a rack assembly primarily configured for securing bicycles within a bed structures of pickup trucks, the rack assembly is not limited to securing bicycles and is not necessarily limited to be utilized in association with pickup trucks only.

Referring now to FIGS. 1-11, rack assembly 2 according to the present invention is illustrated as broadly comprising rack frame and securing assembly 24. Rack frame 3 broadly includes base support 4, wheel receiving means 7, which is defined by a generally L-shaped cross-sectional geometry extending therefrom and which also may be referred to as wheel well 7, and cross bars 6a, 6b. Wheel well 7 may be joined to base support 4 by welding, mechanical, fastening, or another suitable joining technique. Wheel well 7 is generally sized and configured to receive the front wheel of a bicycle therein. Cross bars 6a and 6b are fixed to wheel well 7 at locations 9a and 9b and to base support 4 at locations 5a and 5b by welding or a suitable mechanical fastening technique. Wheel well 7, base support 4, and cross bars 6a and 6b may be formed from tubular metallic materials or another type of suitable material.

Rack assembly 2 can be configured to comprise extensible arm 8, which is extendable in directions 15 and 15' and rotatable about axis 19 of cross bars 6a or 6b. A suitable configuration for extensible arm 8 is shown in FIG. 1. Extensible arm 8 includes gripping member 12, which is slidable along a length of shaft 14 through an opening of gripping member 12. Shaft 14 includes teeth 11 along a length thereof that are engagable with corresponding teeth (not shown) of the gripping member. Gripping member 12 is configured to be manually moved along shaft 14 in direction 15 by a user. Gripping member 12 may also be moved in direction 15' by a user upon actuating release mechanism 21, which disengages the teeth of gripping member 12 from teeth 11. Gripping member 12 further includes wheel hook 10 projecting therefrom that is sized and configured to fit around a wheel of a bicycle. While wheel hook 10 is preferably, secured about the wheel of a bicycle, it is conceivable that the wheel hook could be fit around another component of the bicycle, e.g. a descending frame member. The aperture of wheel hook 10 is preferably sized to receive wheels of a plurality of sizes and dimensions such that the rack assembly may receive an array of bicycle types. Once wheel hook 10 is positioned at a desired location along the length of the shaft 14, gripping mechanism 12 may only be moved in direction 15' to elongate the length of extensible arm 8 by disengaging gripping member 12 from shaft 14. Gripping member 12 is preferably of the type sold under the trademark RATCHETING QUICK-LOAD (RQL) by Sportworks of Woodinville, Wash. The RQL system is described in greater detail in U.S. Pat. No. 6,439,397 which is expressly incorporated herein by reference in its entirety. The end of shaft 14 includes generally C-shaped clamp 16 welded thereto that is fitted around two semicircular bearings 32a and 32b secured to cross bar 6a, 6b by pins or another suitable fasteners (not shown). Clamp 16 exhibits a profile of bearings 32a and 32b and encloses at a least a portion thereof. Another generally C-shaped clamp 16' is fitted into slots (not shown) of clamp 16 so that clamps 16 and 16' collectively enclose bearings 32a and 32b. Clamps 16 and 16' are secured together with fasteners 18 so that the interior portions of clamps 16 and 16' bear against bearings 32a and 32b and, thus, retain extensible arm 8 on cross bar 6b. Extensible arm 8 also rotates about axis 19 along arc 17.

A user may easily remove extensible arm 8 so that it may be installed an either side of wheel well 7. This is accomplished by removing fasteners 18 and bearings 32a and 32b and reinstalling them on the desired side. This feature is important if more than one rack assembly 2 is to be used in a pickup truck bed. It may be desirable for extensible arm 8 of a first rack assembly to be mounted on a left side thereof and extensible arm 8 of a second rack assembly to be mounted on an opposing right side thereof to prevent interference between respective extensible arms 8.

With continuing reference to FIGS. 1-11, two or more securing assemblies 24 can be secured to crossbar 6, with one securing assembly 24 secured to crossbar 6a and the other securing assembly 24 secured to crossbar 6b. Securing assemblies 24 preferably includes strap portions 28 that are fitted through ratcheting mechanisms 30 that may move strap portions 28 in a direction 29 therethrough to adjust the length of the strap portions extending from the ratcheting mechanism. Ratcheting mechanism 30 may be attached to respective crossbars 6a and 6b by a suitable fastener, such as a rivet, a screw, or another suitable method of joining. Ratcheting mechanism 30 assists in preventing strap portions 28 from loosening after they are tensioned. An end of securing assemblies 24 includes stopper 26 having a generally elongated shape coupled thereto. Alternatively, stopper 26 may be integrally formed with strap portions 28. In the embodiment shown in FIGS. 1-11, the ability to tension securing assembly 24 to secure rack assembly 2 to a pickup truck bed is independent from the ability to adjust the length of extensible arm 8. Although a ratcheting type securing assembly is depicted in FIG. 1, other types of securing assemblies may used, such as nylon straps used in conjunction with buckles. However, ratcheting type mechanisms are more advantageous because they prevent the straps from easily loosening. As will be discussed in more detail in FIGS. 2-17, stoppers 26 are sized small enough so that they may be inserted through a gap between the pickup truck bed and an open tailgate and large enough to restrict removal thereof, in one direction, when the tailgate is closed.

Figure 2:
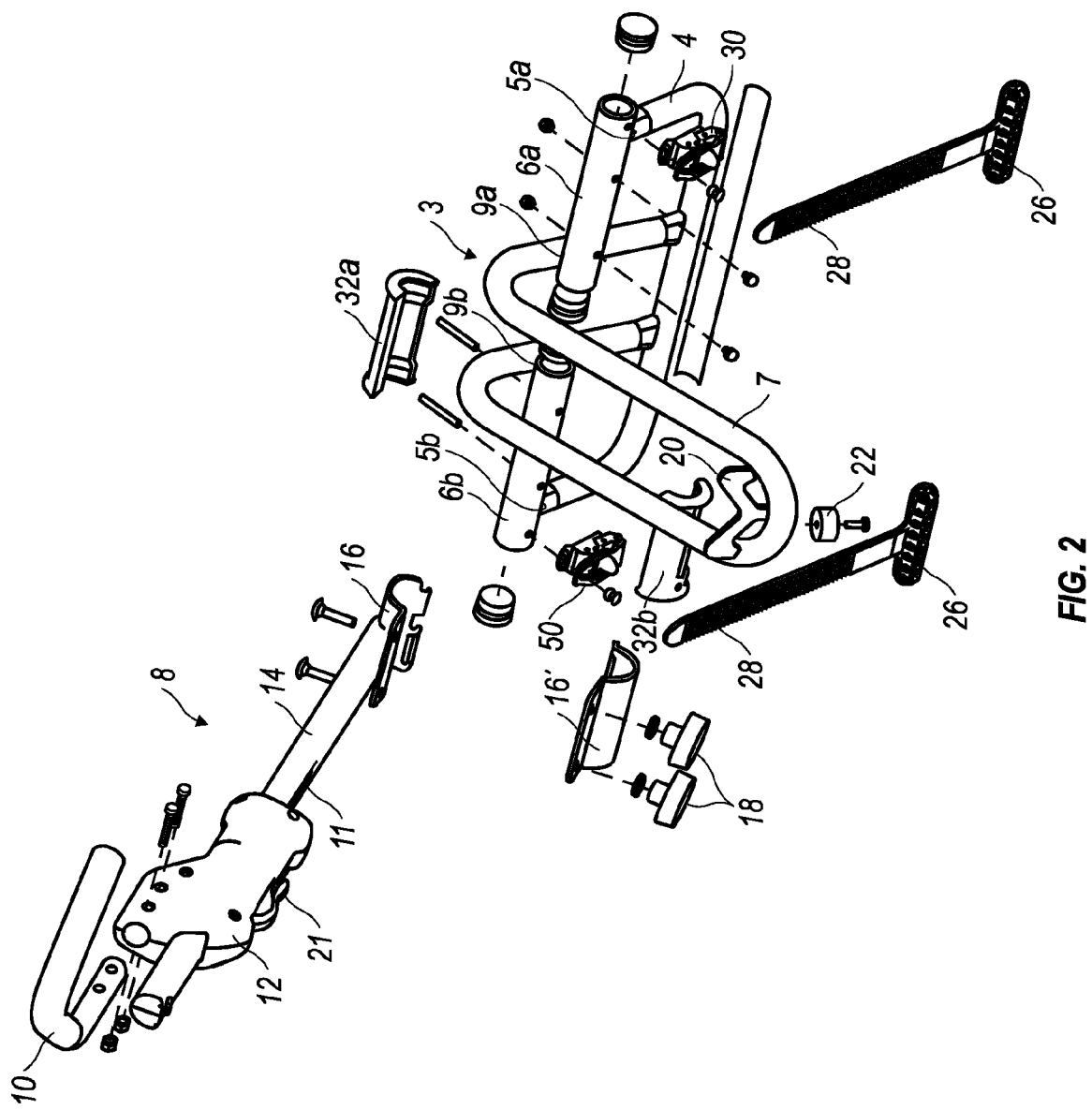
FIG. 2 is an exploded perspective view of a rack assembly according to the present invention.
Figure 3:
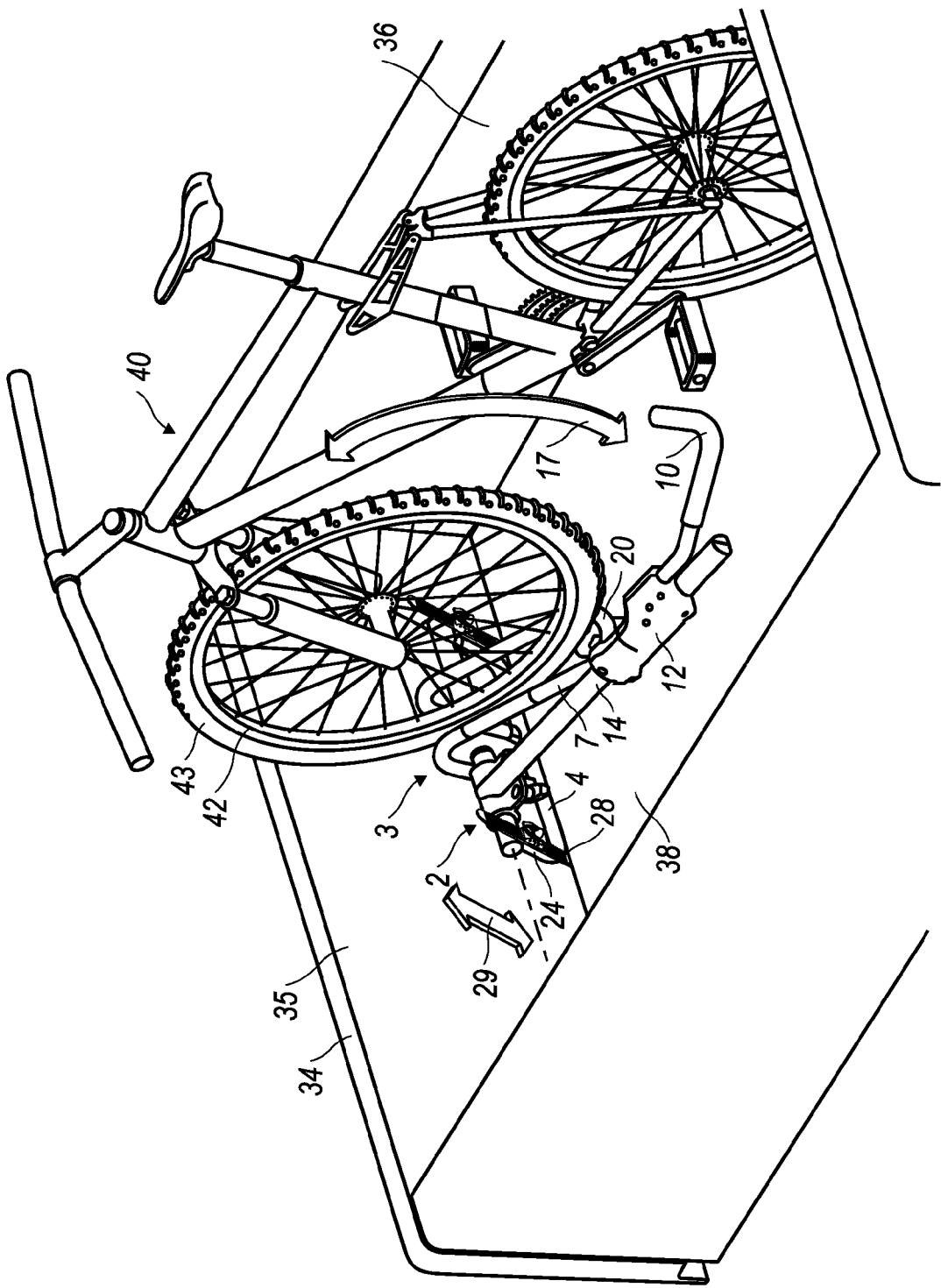
FIG. 3 is a perspective view of a rack assembly according to the present invention within a bed of a vehicle, e.g. a pickup truck, and illustrating movement of the extensible arm.
Figure 4:
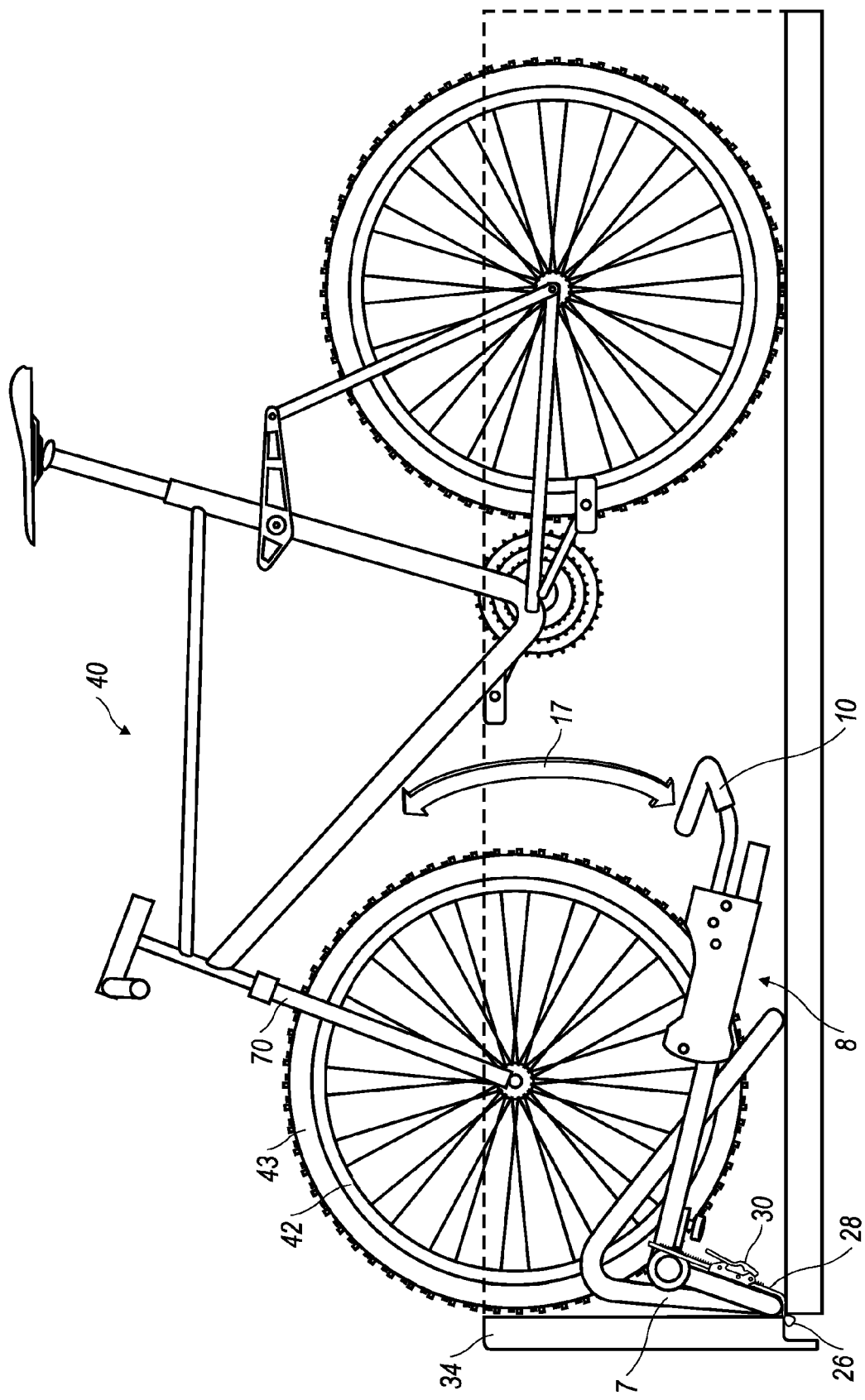
FIG. 4 is a side elevation view of a rack assembly according to the invention within a bed of a vehicle; e.g., a pickup truck, and illustrating movement of the extensible arm toward a raised position for securing the bicycle above the bed of the truck.
Figure 5:
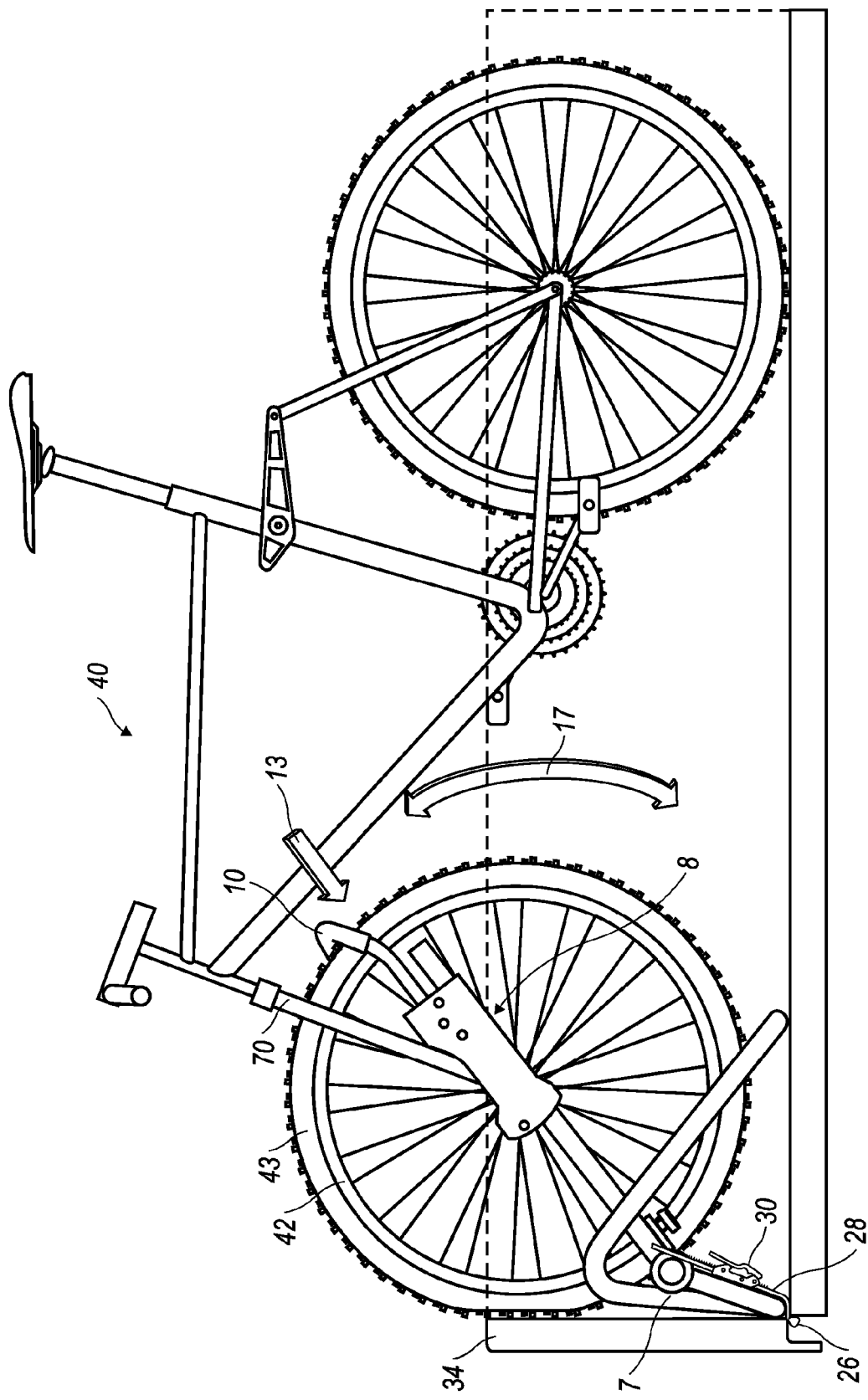
FIG. 5 is a side elevation view of a rack assembly according to the invention within a bed of a vehicle; e.g., a pickup truck, and illustrating movement of the extensible arm and wheel hook for constrictively securing the bicycle above the bed, and against the tailgate, of the truck.

At an end of wheel well 7, distal front base support 4, wheel guide 20 may be secured using a suitable fastener. Wheel guide 20 may have a generally V-shaped cross sectional shape that is sized to receive a portion of a bicycle tire. Wheel guide 20 may also have a cross-sectional thickness dimensioned so that it will engage the treads of a typical mountain bike tire contacting it such that spinning of the tire may be prevented. Spacer 22, formed from a material such as rubber, may be attached to the portion of base support 4 underneath wheel guide 20 to provide a contact point with the pickup truck bed and prevent damage thereof. An exploded perspective view of rack assembly 2 is shown in FIG. 2.

Figure 6:
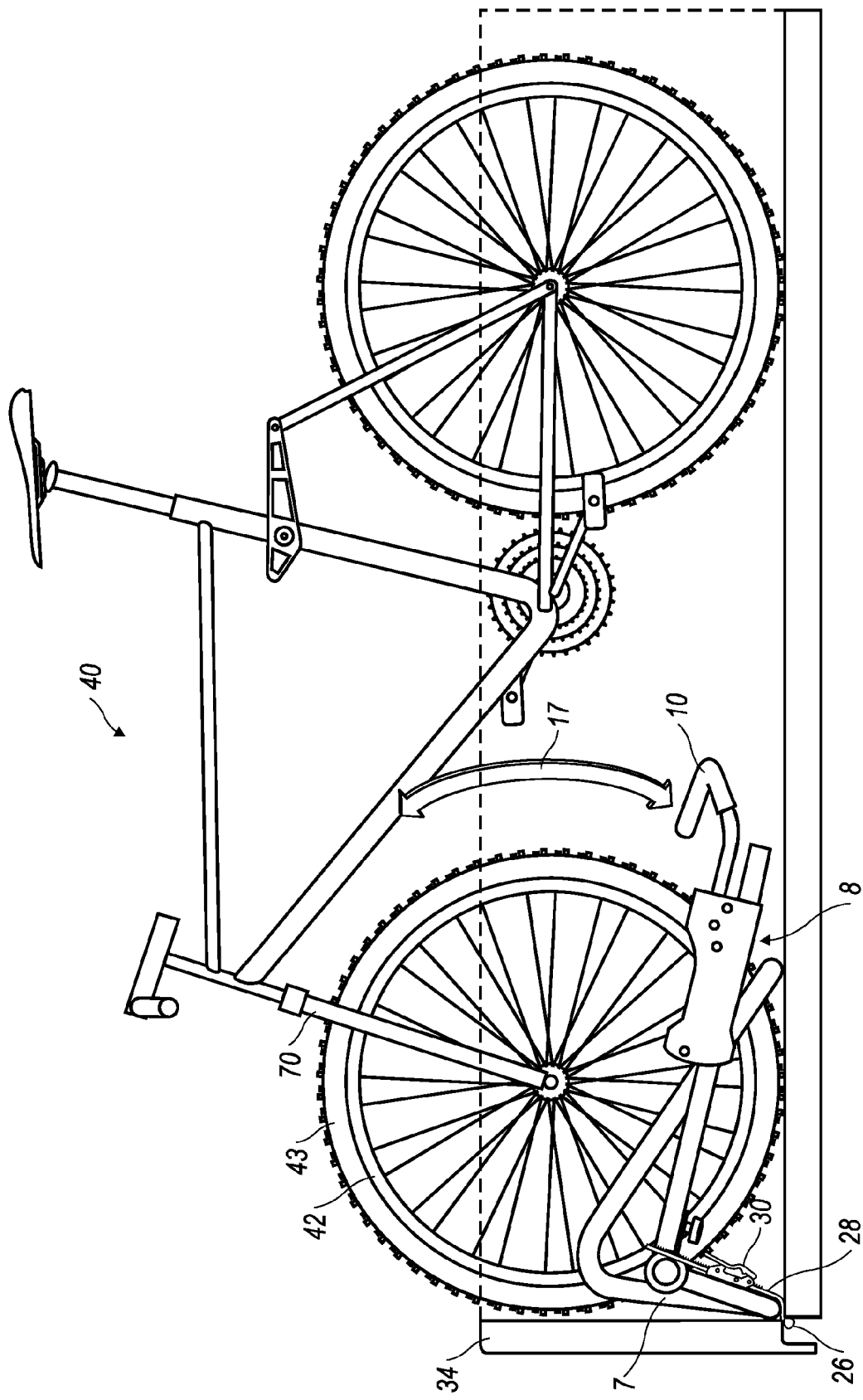
FIG. 6 is a side elevation view of a rack assembly according to the invention within a bed of a vehicle; e.g., a pickup truck, and illustrating the bicycle positioned within the wheel well of the rack assembly and the extensible arm in a lowered position.
Figure 7:
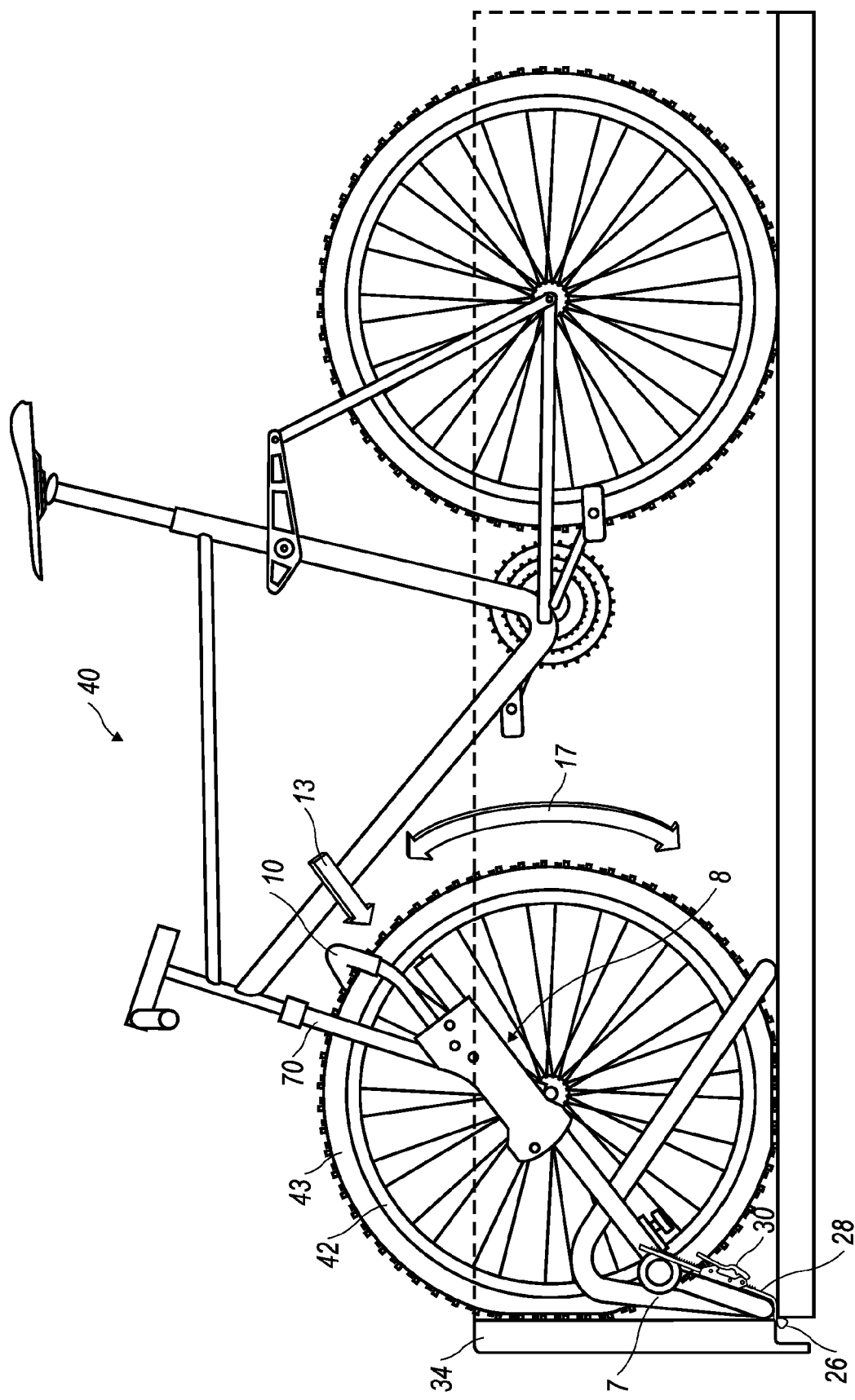
FIG. 7 is a side elevation view of a rack assembly according to the invention within a bed of a vehicle; e.g., a pickup truck, and illustrating the extensible arm and wheel hook constrictively securing the bicycle to the bed and tailgate surfaces of the truck.

Operation of rack assembly 2 can be better understood by reference to FIGS. 2-11. Side views of rack assembly 2 secured over bed 38 are shown in FIGS. 4-7 and FIGS. 3, 10 and 11, are perspective views of rack assembly 2 installed in bed 38. As illustrated in the figures, rack assembly 2 is placed in bed 38 with extensible arm 8 lying flat in bed 38 and stoppers 26 inserted through the gap between bed 38 and tailgate 34 (See FIGS. 8-9). Extensible arm 8 points inward and away from tailgate 34 such that it may be positioned so that it does not get in the way of the user when the user is loading bicycle 40 over bed 38. Tailgate 34 is closed and each of securing assemblies 24 tensioned by engaging racketing mechanisms, 30, which in turn causes base support 4 to bear against tailgate 34 and, thus, secure rack assembly 2 over bed 38. Front wheel 42 of bicycle 40 is inserted into wheel well 7 so that a portion of front wheel 42 bears against surface 35 of tailgate 34 to create a first point of contact for front wheel 42 (See FIGS. 4-5). The contact between wheel guide 20 and front wheel 42 can comprise a second point of contact for front wheel 42. Alternatively, as illustrated in FIGS. 6-7, a second point of contact can comprise that point of contact between front wheel 42 and surface 35 of the bed structure.

Figure 8:
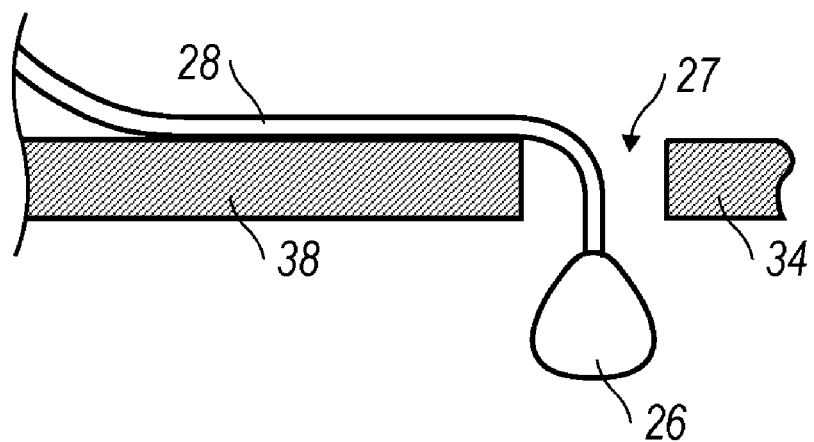
FIG. 8 is a partial sectional view illustrating a securing assembly of the rack assembly of FIG. 1 inserted in a gap between a pickup truck bed and a tailgate.
Figure 9:
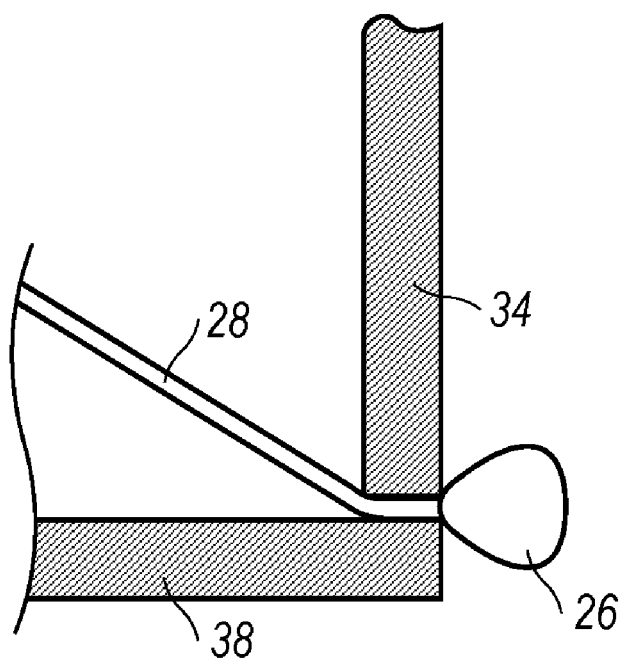
FIG. 9 is a partial sectional view illustrating a securing assembly of the rack assembly of FIG. 1 inserted in a gap between a pickup truck bed and a tailgate with the tailgate closed and the securing assembly tensioned.
Figure 10:
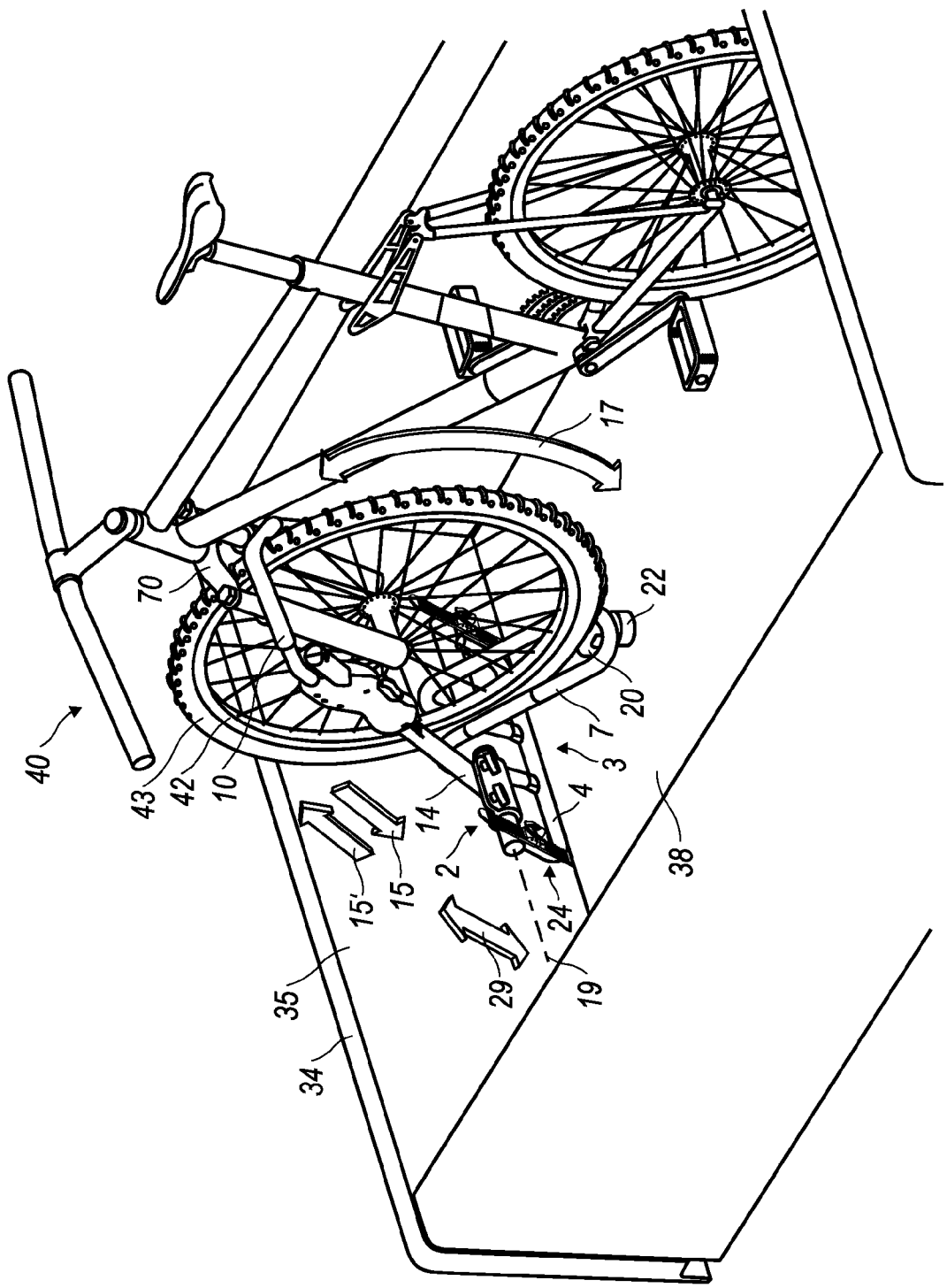
FIG. 10 is a perspective view of a rack assembly according to the invention illustrating a front wheel of a bicycle engaged by an extensible arm of the rack assembly for securing the bicycle within a bed of a pickup truck.
Figure 11:
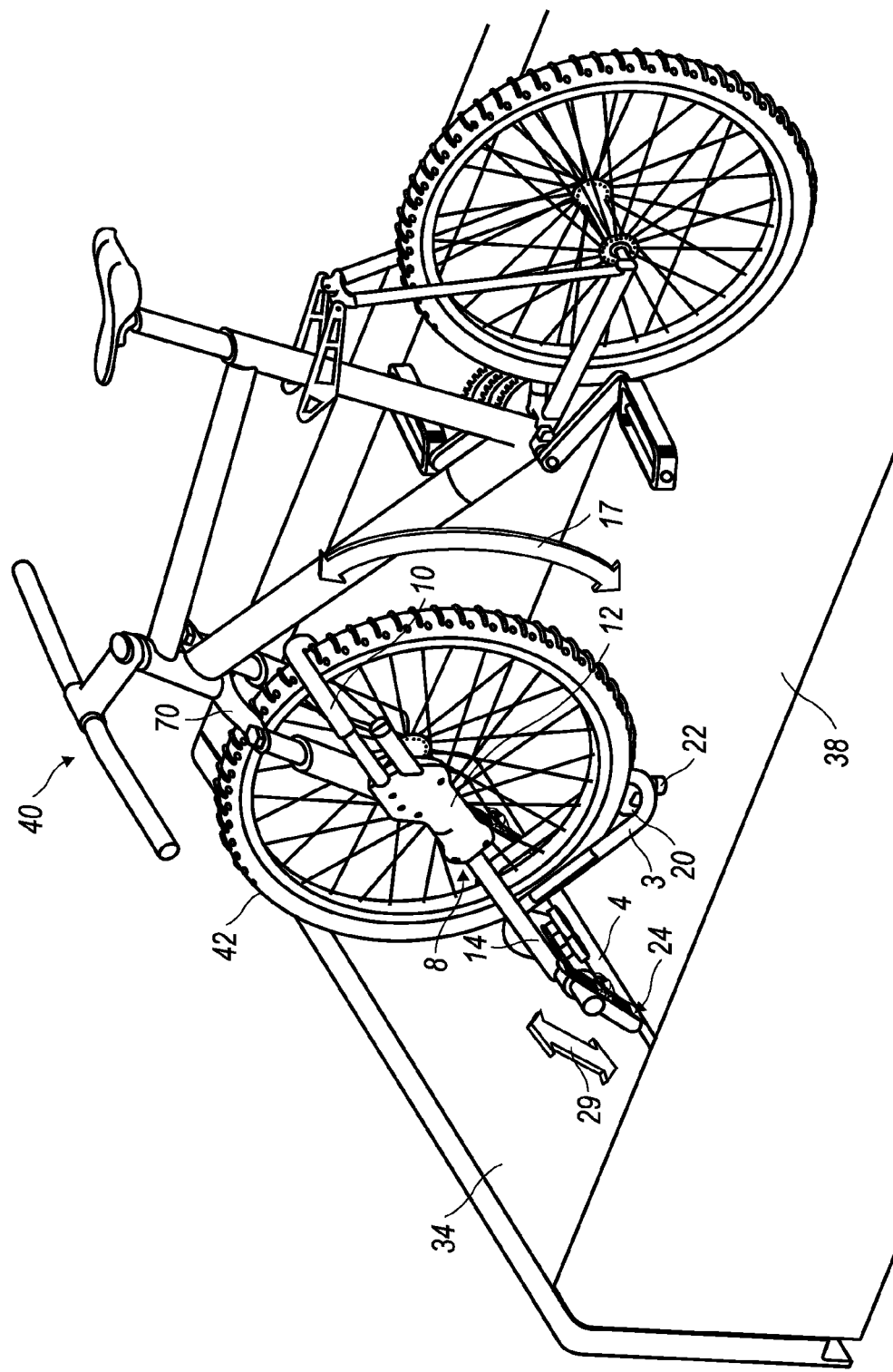
FIG. 11 is a perspective view of a rack assembly according to the invention.
Figure 12:
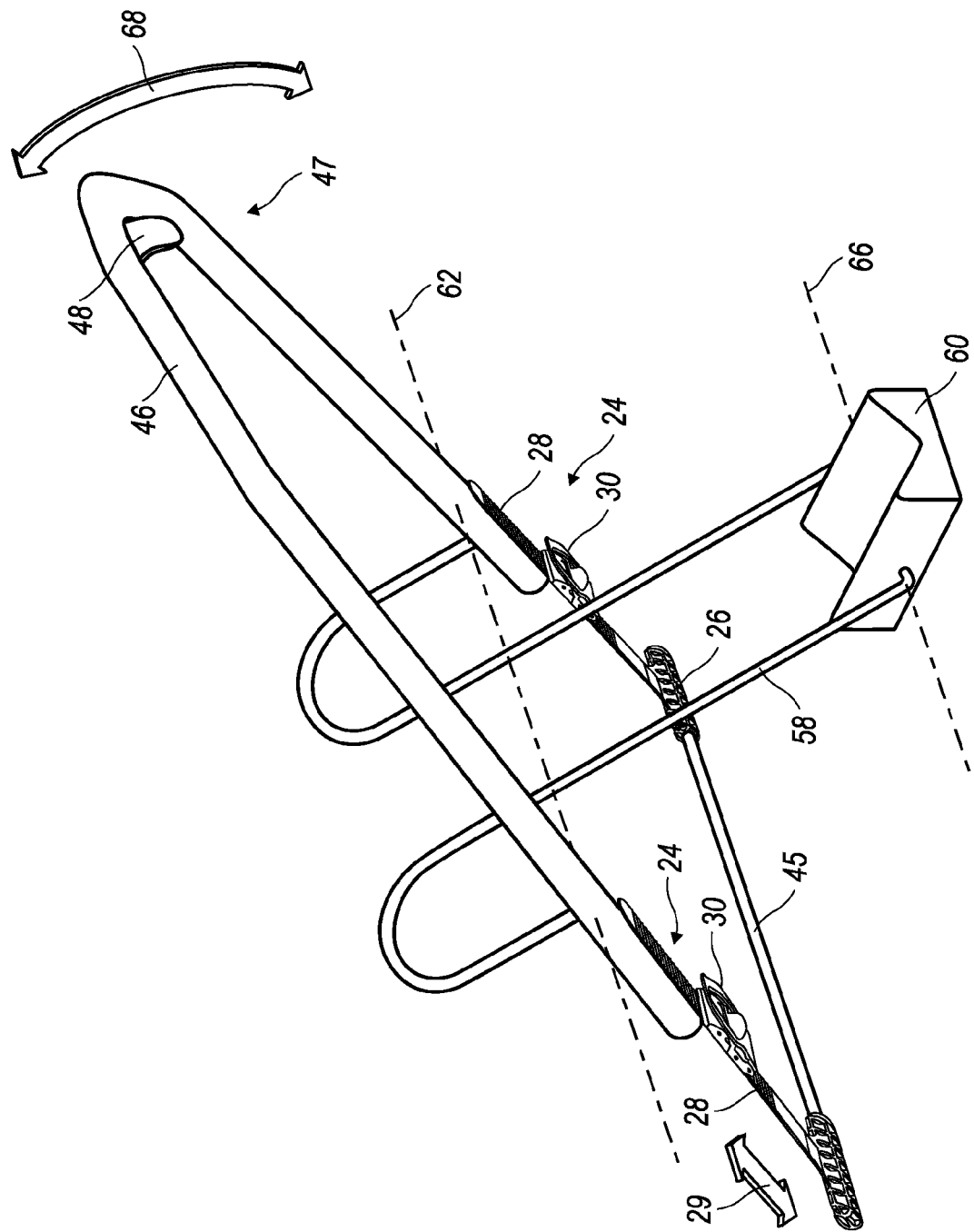
FIG. 12 is a perspective view of another exemplary embodiment of a rack assembly according to the invention.
Figure 13:
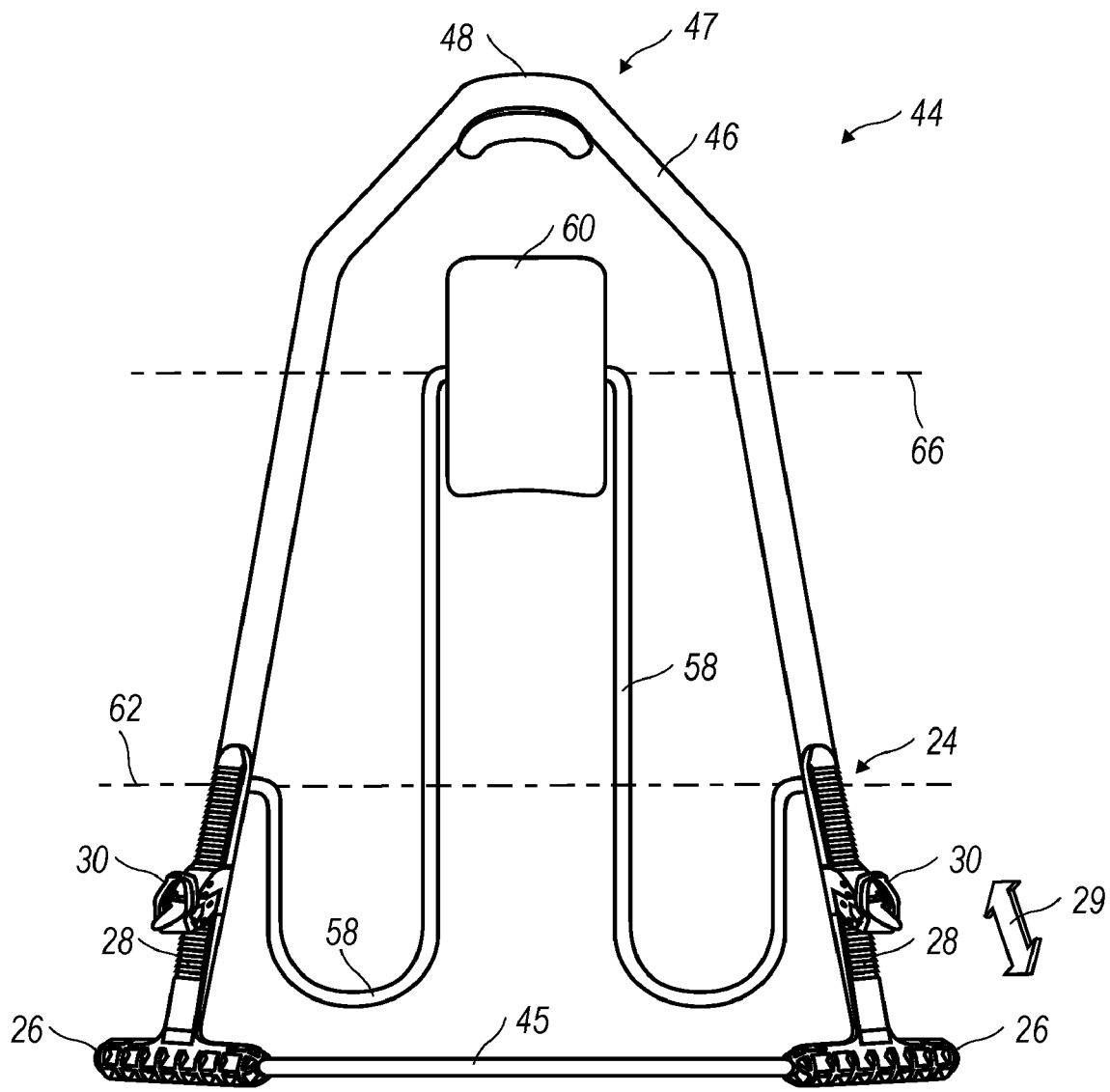
FIG. 13 is a plan view of a front side of the rack assembly illustrated in FIG. 12.
Figure 14:
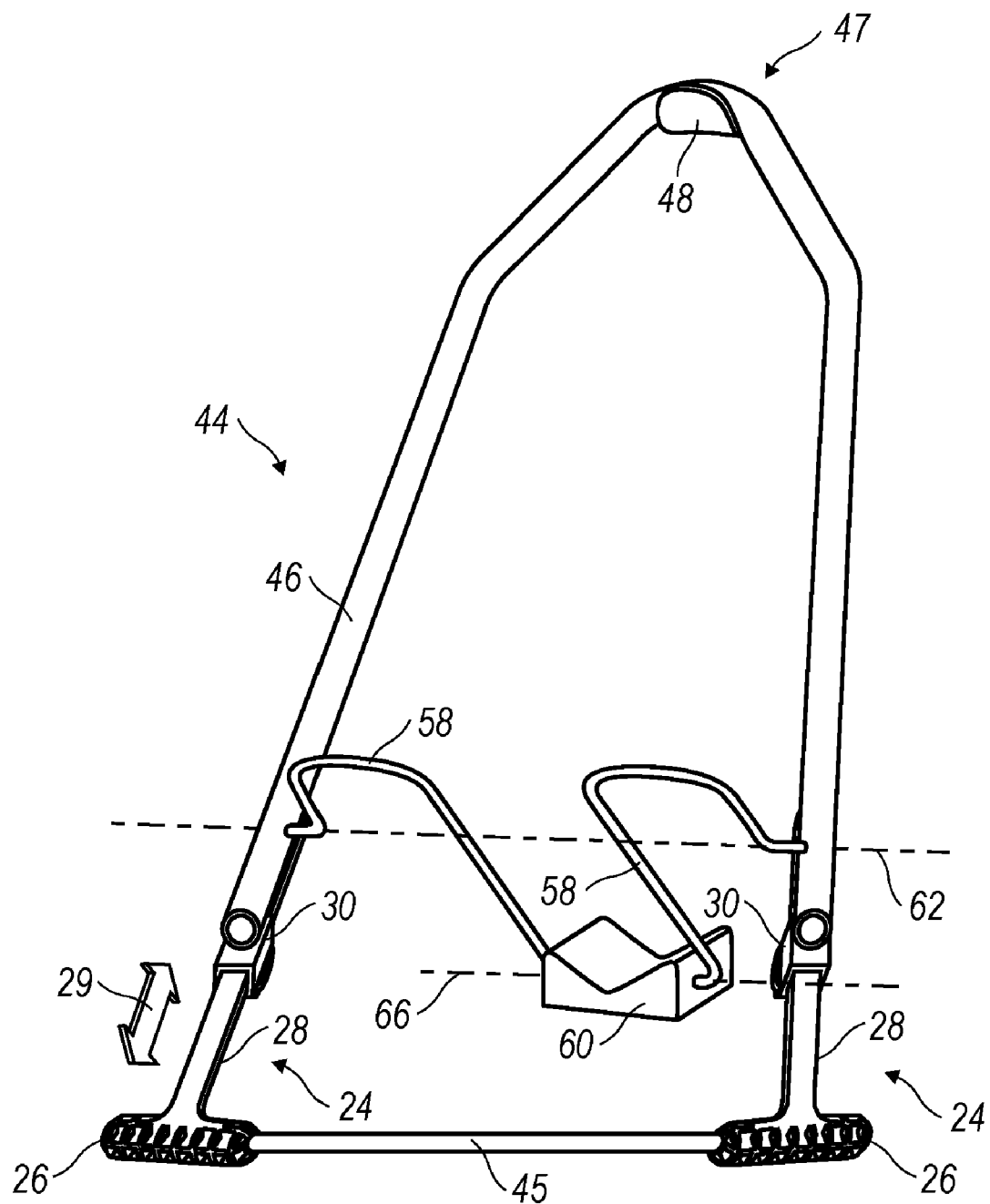
FIG. 14 is a perspective view illustrating a rearward side of the rack assembly illustrated in FIG. 12.

The functioning of securing assembly 24 is more easily understood with reference to FIGS. 8-9, which is shown without wheel guide 3 and base support 4 for clarity. As illustrated in FIGS. 8-9, stoppers 26 are inserted through gap 27 between bed 38 and tailgate 34 when the tailgate is in the open position. After tailgate 34 is closed, straps 28 may be tensioned, which causes stoppers 26 to bear against the outside of the pickup truck and cause base support 4 (not shown) to bear against surface 35 of tailgate 34, thus, securing rack assembly 2 over bed 38. Although it is preferable to employ securing assembly 24, base support 4 may also be secured to bed 38 by more permanent securing techniques, such as bolting, which necessitates drilling additional holes in bed 38.

As shown more clearly in FIGS. 1-7 and 10-11, once front wheel 42 is received by wheel well 7, extensible arm 8 may be rotated upwardly about axis 19 and wheel hook 10, which is configured to accommodate a variety of wheel sizes, moved downwardly in direction 15 to engage and apply pressure to tire 43 of front wheel 42, thus, creating a third point of contact with front wheel 42. Extensible arm 8, thus, is capable of accommodating a wide variety of front wheel sizes due its ability to adjust its length. Extensible arm 8 is rotated upwardly from behind fork 70 so that wheel hook 10 engages tire 43 aft of fork 70. Wheel hook 10 of extensible arm 8 engages front wheel 42 in a so-called "over center" position to prevent extensible arm 8 from being able to move along the circumference of front wheel 42, which may allow the extensible arm to disengage the front wheel 42 (See FIGS. 7, 10 and 11). Because wheel hook 10 engages front wheel 42 in an over center position and extensible arm 8 will not substantially elongate in direction 15', in the absence of an actuation of release mechanism 21 by a user, rotational movement of extensible arm 8 along arc 17 is prevented due to the interference of wheel hook 10 with tire 43 and/or forks 70. To allow rotational movement of the extensible arm about the circumference of front wheel 42, extensible arm 8 must first be elongated in direction 15' by actuating release mechanism 21. Wheel well 7 also substantially prevents lateral rotational movement of the front wheel due to the interference of front wheel 42 with the interior of wheel well 7. If front wheel 42 were allowed to rotate, for instance, if wheel well 7 was not present, the front wheel could lose contact with surface 35 of tailgate 34 and allow the bicycle to fall over in the bed. Although it is preferable for the rack assembly 2 to include wheel well 7 for lateral stability, wheel well 7 is not necessarily required to enable rack assembly 2 to fully function.

Although the exemplary embodiment illustrated in FIGS. 1-11 has been described with a first point of contact of tire 43 being with tailgate 34, rack assembly 2 may be modified so that base support 4 is bolted or otherwise secured to bed 38 and a first contact point may be the interior of side wall 36 of a pickup truck or a back wall of bed 38.

Figure 15:
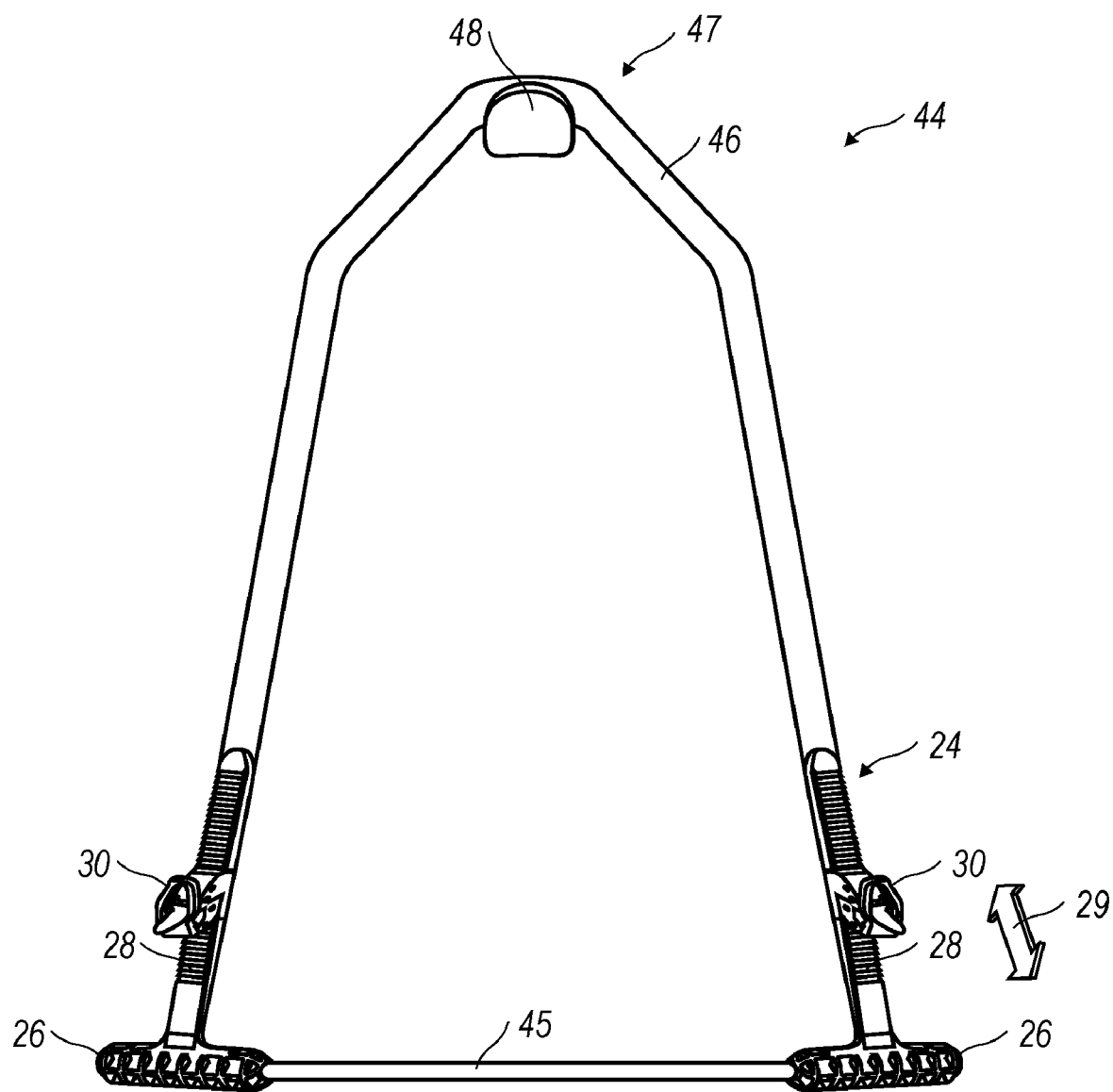
FIG. 15 is a front plan view of a rack assembly with wheel guide removed.
Figure 16:
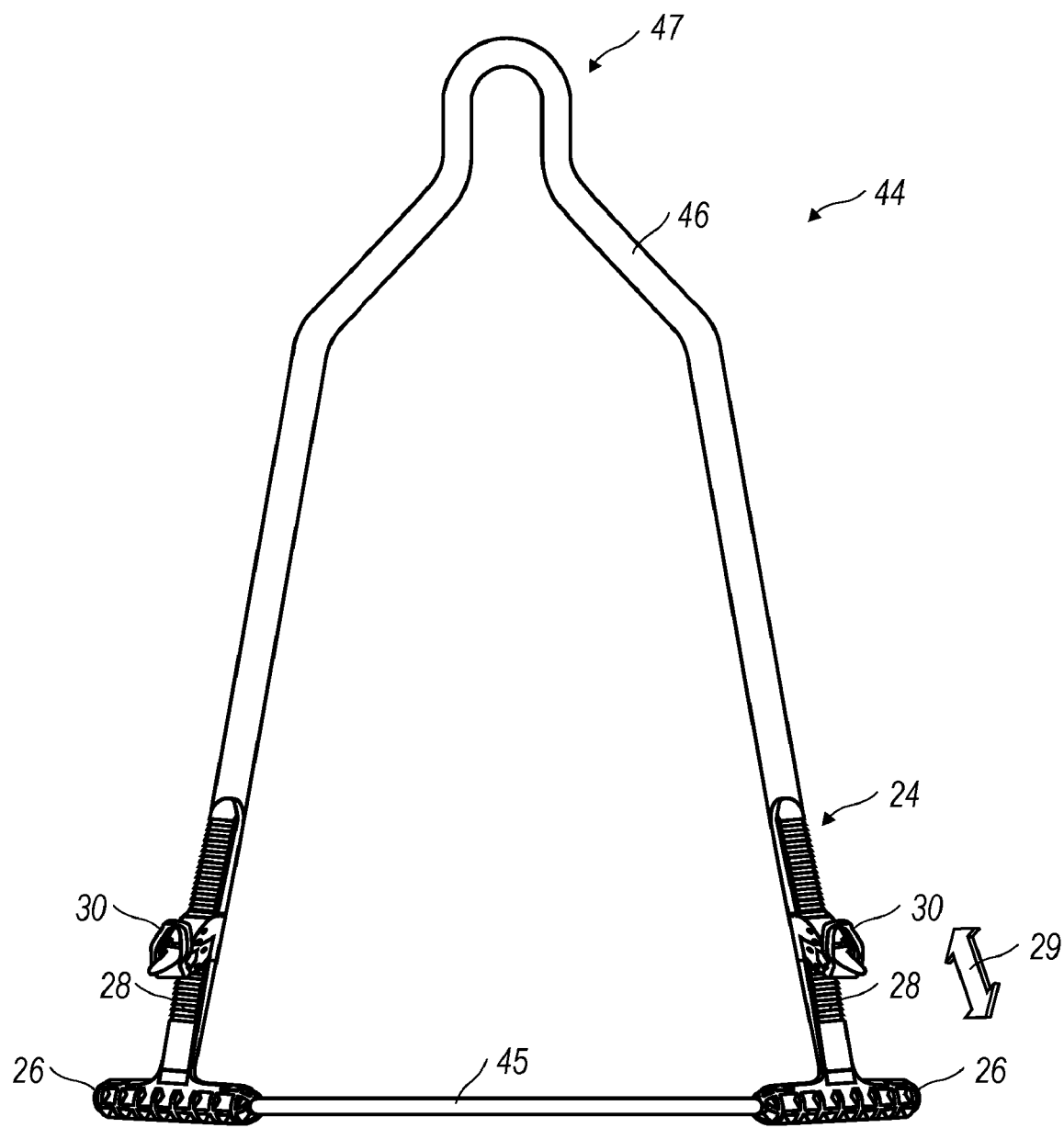
FIG. 16 is a plan view of a rack assembly wherein the wheel restraining portion of the rack frame has a shape that corresponds to a portion of a wheel; and, FIG. 17 is a perspective view of a rack assembly including a wheel saddle tray for receiving a portion of wheel therein.
Figure 17:
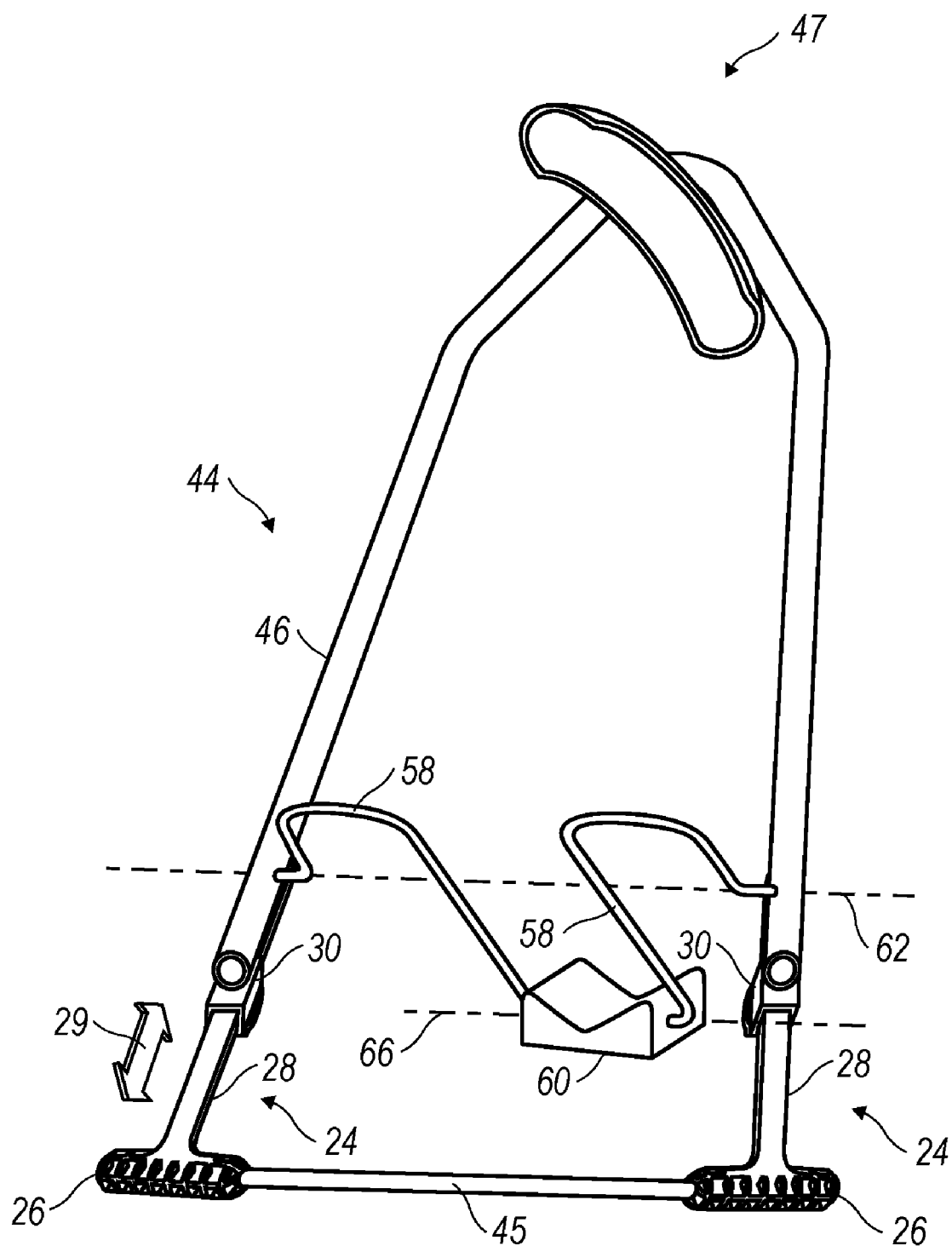

Other exemplary embodiments of a rack assembly according to the invention are illustrated in FIGS. 12-17. In these embodiments rack assembly 44 generally includes rack frame 46 which is sized and configured to fit around a front wheel of a bicycle, or like wheeled vehicle. Rack frame 46 exhibits a generally U-shaped geometry and may be formed from tubular metallic materials or other suitable materials. Rack frame 46 includes wheel restraining portion 47, which is, preferably, integral with rack frame 46. Wheel restraining portion 47 secures tire contact 48 at a distal end of rack frame 46. Tire contact 48 has a generally C-shaped cross-sectional geometry and is shaped to receive a portion of a front wheel of a bicycle and bear against the front wheel when biased by a user. In the embodiments illustrated in FIGS. 16-17, wheel restraining portion 47 may be configured to more closely correspond to the profile of a the sidewall and tread portion of the front wheel such that lateral movement of the bicycle, and steering movement of a front wheel may be prevented. Alternatively, wheel restraining portion 70 may be configured to include wheel saddle trays 49, which substantially secure about a perimeter of front wheel 42, and more specifically, about a portion of the treads and sidewalls thereof. Wheel saddle trays 49 generally prevent rotational movement of the front wheel about its axle and also assist in preventing lateral and steering type movement of the front wheel. Rack assembly 44 further includes securing assemblies 24, which each have strap portions 28 threaded through ratcheting mechanisms 30, and stoppers 26. Ratcheting mechanisms 30 may be attached to rack frame 46 using fasteners, such as rivets, screws, or another suitable methods of joining. Securing assemblies 24 are generally identical to those described with respect to the embodiment of FIGS. 1-11, however, unlike the embodiment of FIGS. 1-11, securing assemblies 24 of FIGS. 12-17 function to both secure rack assembly 44 to the bed structure of a vehicle and serve to adjust the length of rack frame 46 securing assembly 24. Elongated member 45 may also be used to join opposing ends of each respective stopper 26 for added lateral stability. Rack assembly 44 can further include wheel well 58 that is attached to rack frame 46 and which is rotatable about axis 62. Wheel guide 60 is attached to wheel well 58 and is independently rotatable about axis 66. Although it is preferable for rack assembly 44 to include wheel well 58 for added lateral stability, as illustrated in FIG. 15, wheel well 58 is not necessarily required for the proper operation of rack assembly 44.

In operation, rack assembly 44 is installed in bed 38 with rack frame 46 lying flat in the bed. Rack frame 46 points inward and away from tailgate 34; thus, being positioned so that it does not get in the way of the user when the user is loading bicycle 40 over bed 38. Rack assembly 44 is placed over bed 38 and stoppers 26 are inserted through gap 27 between bed 38 and tailgate 34. Tailgate 34 is then closed to secure stoppers 26 therein. Front wheel 42 of bicycle 40 is then inserted into wheel well 58 so that a portion of the front wheel bears against surface 35 of tailgate 34 to create a first point of contact for front wheel 42. The contact between wheel guide 60 and the front wheel is the second point of contact for front wheel 42.

Once front wheel 42 is received by wheel well 58, rack frame 46 may be rotated upwardly about front wheel 42 along arc 68 and tire contact 48 moved downwardly in direction 29 by user tensioning securing assemblies 24 to engage and apply a downward, or compressive force upon tire 43 of front wheel 42. Thus, a third point of contact is created with front wheel 42. Rack frame 46 is rotated upwardly from behind forks 70 so that the tire contact engages tire 43 aft of forks 70. The ability to adjust the length of securing means 28; e.g., straps, with respect to rack frame 46 enables the rack assembly to accommodate a wide variety of front wheel sizes and bicycles. Tire contact 48 of rack frame 46 engages front wheel 42 in a so-called "over center" position to prevent rack frame 46 from being able to move along the circumference of front wheel 42 which may allow rack frame 46 to disengage front wheel 42. Because tire contact 48 engages front wheel 42 an over center position and rack frame 46 will not substantially move in direction 29 until securing assembly 24 is released by the user, rotational movement of rack frame 46 along arc 68 is prevented due to the interference of tire contact 48 with tire 43. Securing assembly 24 must be released by a user to allow rotational movement of rack frame 46 about the circumference of front wheel 42. Similar to the embodiment of FIGS. 1-11, wheel well 58 substantially prevents lateral rotational movement of front wheel 42 due to the interference of the front wheel with the interior of the wheel well.

While the present invention has been illustrated and described in what is deemed to be the preferred embodiments, it should be understood by those having ordinary skill in the art that various changes and modifications may be made to the invention without departing from the spirit and scope of the invention. Therefore, it should be appreciated by those having ordinary skill in the art that the present invention not to be limited to the particular embodiments disclosed herein.

What is claimed is:

1. A rack assembly for securing a bicycle, with both wheels still attached, in the bed of a pickup truck without requiring physical modification of the pickup truck bed, said rack assembly comprising:

a rack frame having a securing assembly configured for releasably securing the rack frame in the bed of a transporting pickup truck and a bicycle restraining portion configured for abutting engagement with a portion of a bicycle to be transported in the pickup truck bed;

said bicycle restraining portion comprising a wheel well with a front base portion and a wheel guide, said wheel guide located distally from said front base portion for contacting a lower rear portion of a bicycle wheel, said bicycle restraining portion further comprising a constrictable arm configured to abuttingly engage the front tire of the bicycle, said bicycle restraining portion having a bicycle transporting configuration in which said constrictable arm exerts a compression force against an upper rear portion of the bicycle wheel, obliquely directed with respect to both horizontal and vertical, the rear position of said wheel guide and the constrictable arm together urging upon the bicycle front tire thereby pressing the tire into stabilized contact with the tailgate of the pickup truck at at least one point in the bicycle transporting configuration, and said securing assembly comprising an anchor member having a secured configuration in which said front base portion is maintained in abutment against a pickup truck tailgate and bed floor thereby substantially fixing said rack frame relative to the bed.

2. A bicycle transport system including a rack assembly securing a bicycle, with both wheels still attached, in the bed of a pickup truck without requiring physical modification of the pickup truck bed, said transport system comprising:

a rack frame having a securing assembly releasably securing said rack frame in the bed of a transporting pickup truck and a bicycle restraining portion maintained in abutting engagement with a front tire of a bicycle being transported in the pickup truck bed;

said bicycle restraining portion further comprising a wheel well with a front base portion and a wheel guide, said wheel guide located distally from said front base portion for contacting a lower rear portion of a bicycle wheel, said bicycle restraining portion further comprising a constrictable arm in pressing engagement with the front tire of the bicycle in a bicycle transporting configuration, said constrictable arm exerting a compression force against an upper rear portion of the bicycle wheel, obliquely directed with respect to both horizontal and vertical, the rear position of said wheel guide and constrictable arm together urging upon the bicycle front tire thereby compressing the tire into a substantially fixed position against the tailgate of the pickup truck in the bicycle transporting configuration, and said securing assembly comprising an anchor member having a secured configuration in which said front base portion is maintained in abutment against a pickup truck tailgate and bed floor thereby substantially fixing said rack frame relative to the bed.

3. The bicycle transport system as recited in claim 2, wherein said compression force exerted by said constrictable arm presses the front tire of the bicycle into contact with the truck bed at at least two points in the transporting configuration.

4. The bicycle transport system as recited in claim 3, wherein at least one of said two points of contact between the front tire of the bicycle and the truck bed occurs upon a predominantly horizontal surface of the truck bed.

5. The bicycle transport system as recited in claim 2, wherein said compression force exerted by said constrictable arm presses the front tire of the bicycle into contact with the truck bed at at least one point in the transporting configuration and into contact with said rack frame at at least one point in the transporting configuration.

6. The bicycle transport system as recited in claim 5, wherein said at least one point of contact between the front tire of the bicycle and the truck bed occurs upon a predominantly horizontal surface of the truck bed.

7. A rack assembly for securing a wheel of a bicycle in a transporting vehicle comprising a bed structure, said rack assembly comprising:

a rack frame and a securing assembly;

said rack frame comprising a wheel restraining portion for restraining said wheel, said wheel restraining portion comprising a wheel well with a front base portion and a wheel guide, said wheel guide located distally from said front base portion for contacting a lower rear portion of a bicycle wheel, said wheel restraining portion comprising an extensible arm member pivotal about said wheel for exerting a compressive force against an upper rear portion of the bicycle wheel, said securing assembly configured to secure said front base portion to said transport vehicle tailgate and bed floor, said securing assembly adjustably clampably securable to said rack frame; and said securing assembly and said wheel restraining portion, in combination, configured to simultaneously secure said rack frame to said transporting vehicle and apply a force upon said wheel to compressively secure said wheel between said wheel restraining portion and said vehicle tailgate.

8. The rack assembly as recited in claim 7 wherein said securing assembly and said rack frame are adjustably clampably securable by a ratchet mechanism.

9. The rack assembly as recited in claim 7 wherein an end of said securing assembly is disposed between a surface of said bed structure and the tailgate of said transporting vehicle.

10. The rack assembly as recited in claim 9 wherein said securing assembly comprises a strap having a stopper configured to prevent movement of said securing assembly in one direction when said gate is closed.

11. The rack assembly as recited in claim 7 wherein said wheel restraining portion comprises a bend for securing an outer surface of said wheel.

12. The rack assembly as recited in claim 7 wherein said extensible arm member includes a gripping member movable in a single direction along said extensible arm.

13. The rack assembly as recited in claim 7 wherein said gripping member is movable in two directions along said extensible member upon actuation of a release mechanism.

14. The rack assembly as recited in claim 7 wherein said wheel well pivots with respect to said extensible arm member.

15. The rack assembly as recited in claim 7 wherein said wheel well comprises a pivoting wheel guide.

16. The rack assembly as recited in claim 7 wherein said wheel restraining portion comprises a portion substantially corresponding to the profile of a wheel.

17. The rack assembly as recited in claim 7 comprising a wheel saddle tray.

18. The rack assembly as recited in claim 7 comprising a plurality of securing assemblies separated by a distance.

19. A rack assembly for securing a bicycle in a transporting vehicle comprising a bed structure, said rack assembly comprising:

a rack frame and a securing assembly;

said rack frame comprising a restraining assembly and a wheel well, said wheel well having a front base portion and a wheel guide, said wheel guide located distally from said front base portion for contacting a lower rear portion of a bicycle wheel, said restraining assembly having an extensible arm member pivotal with respect to said bed structure for exerting a compressive force against an upper rear portion of the bicycle wheel, said securing assembly configured to secure said rack frame to said transport vehicle vehicle tailgate and bed floor, said securing assembly adjustably clampably securable to said rack frame; and said securing assembly and said restraining assembly, in combination, configured to simultaneously secure said rack frame to said transporting vehicle and apply a force upon said bicycle such that said bicycle is compressively secured between by said restraining assembly and said tailgate.

20. The rack assembly as recited in claim 19 wherein said extensible arm member is configured to pivot about a wheel of said bicycle wheel and said wheel is compressively secured between said restraining assembly and said tailgate.

21. The rack assembly as recited in claim 20 wherein said wheel is a front wheel.

* * * * *